(12) United States Patent
Min et al.

(10) Patent No.: US 11,905,738 B2
(45) Date of Patent: Feb. 20, 2024

(54) ELECTRONIC DOOR LOCKS HAVING BI-DIRECTIONAL OVERRUNING CLUTCHES AND METHODS OF USING THE SAME

(71) Applicant: NANJING EASTHOUSE ELECTRICAL CO., LTD., Nanjing (CN)

(72) Inventors: Hao Min, Nanjing (CN); Xinwei Jiao, Nanjing (CN); Bo Huang, Nanjing (CN)

(73) Assignee: NANJING EASTHOUSE ELECTRICAL CO., LTD., Nanjing (CN)

( * ) Notice: Subject to any disclaimer, the term of this patent is extended or adjusted under 35 U.S.C. 154(b) by 0 days.

(21) Appl. No.: 17/968,212

(22) Filed: Oct. 18, 2022

(65) Prior Publication Data

US 2023/0045193 A1    Feb. 9, 2023

Related U.S. Application Data

(62) Division of application No. 16/495,153, filed as application No. PCT/CN2019/105542 on Sep. 12, 2019, now Pat. No. 11,708,706.

(51) Int. Cl.
*E05B 47/00* (2006.01)
*F16D 41/066* (2006.01)
*F16D 41/08* (2006.01)

(52) U.S. Cl.
CPC ........ *E05B 47/0012* (2013.01); *F16D 41/066* (2013.01); *F16D 41/088* (2013.01);
(Continued)

(58) Field of Classification Search
CPC .... E05B 17/044; E05B 17/045; E05B 17/046; E05B 2047/0028; E05B 2047/0017;
(Continued)

(56) References Cited

U.S. PATENT DOCUMENTS 5,946,955 A * 9/1999 Suggs ................... E05B 47/068
70/218
8,365,561 B2 * 2/2013 Chang ..................... E05B 47/02
70/279.1
(Continued)

FOREIGN PATENT DOCUMENTS

CN          103016567 A  *  4/2013
WO     WO-2017018920 A1  *  2/2017  ......... E05B 17/0058

*Primary Examiner* — Christine M Mills
*Assistant Examiner* — Christopher F Callahan
(74) *Attorney, Agent, or Firm* — Hang Ming; MM IP SERVICES LLC

(57) ABSTRACT

The present disclosure relates to a bi-directional overrunning clutch, electronic door locks having bi-directional overrunning clutches, and methods of using the same. In certain embodiments, the electronic door lock includes a first locking mechanism for driving an inner wheel through a first torque to rotate a rotatable shaft to operate a locking device on a door by a user from outside, a second locking mechanism for driving inner wheel through the first torque to operate the locking device from an inside, a third locking mechanism for driving an outer wheel rotatable coaxially around the rotatable shaft through a second torque to operate the locking device electronically, and the bi-directional overrunning clutch. When outer wheel rotates at second torque, inner wheel and rotatable shaft rotate along with outer wheel, and when inner wheel rotates at first torque, outer wheel does not rotate along with inner wheel and rotatable shaft.

17 Claims, 11 Drawing Sheets

(52) U.S. Cl.
CPC . *E05B 2047/002* (2013.01); *E05B 2047/0017* (2013.01); *E05B 2047/0026* (2013.01)

(58) Field of Classification Search
CPC ....... E05B 2047/0026; E05B 2047/002; E05B 47/0012; E05B 47/0657; E05B 47/0665; E05B 47/0673; E05B 47/0676; E05B 47/0684; E05B 47/0692; F16D 41/066; F16D 41/088
See application file for complete search history.

(56) References Cited

U.S. PATENT DOCUMENTS

2018/0320412 A1\* 11/2018 Matosian ............ E05B 47/0012
2019/0271175 A1\* 9/2019 Itomi ...................... F16D 41/10

\* cited by examiner

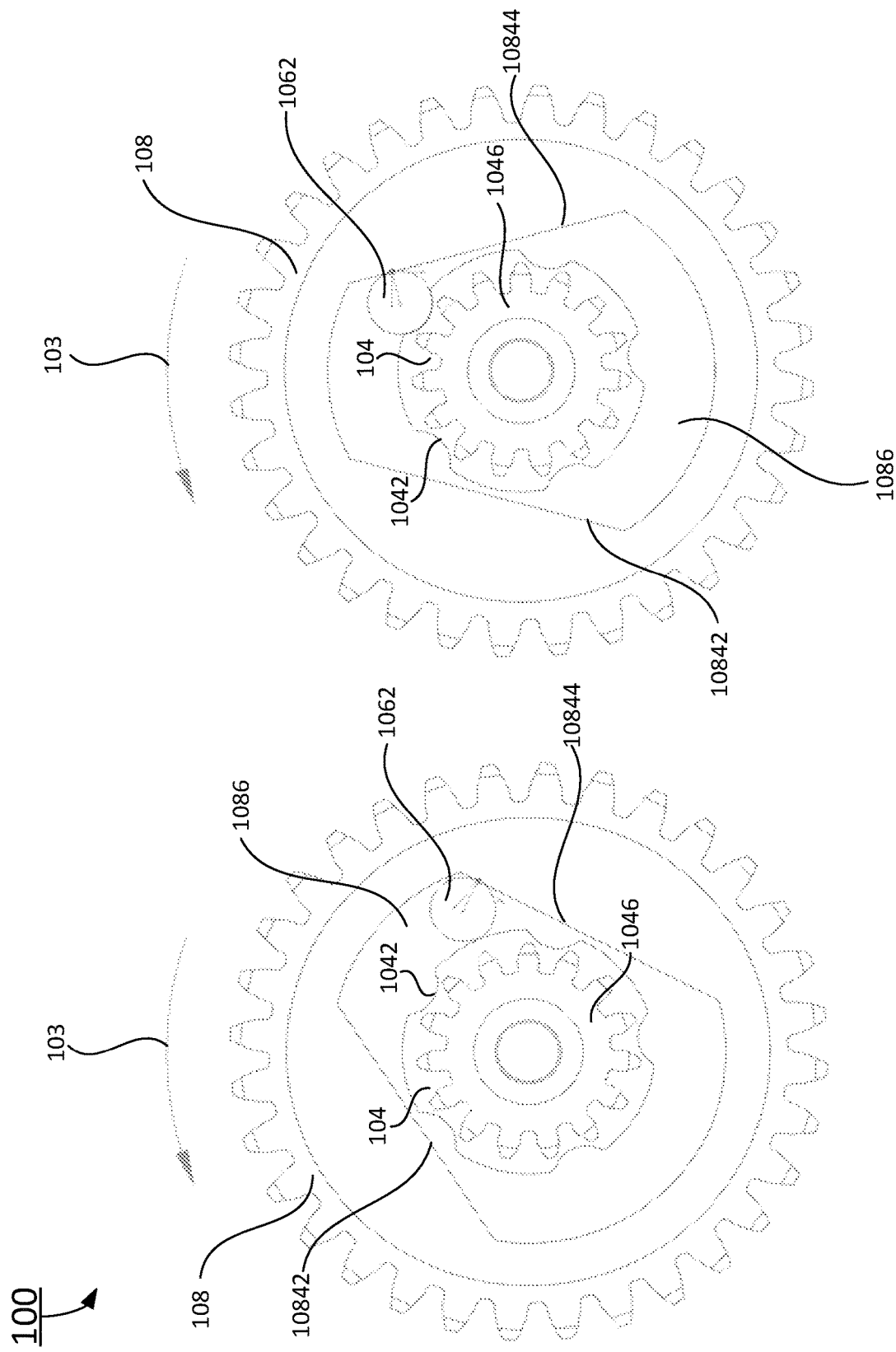

ELECTRONIC DOOR LOCKS HAVING BI-DIRECTIONAL OVERRUNING CLUTCHES AND METHODS OF USING THE SAME

FIELD

The present disclosure generally relates to safety and security, and more particularly to bi-directional overrunning clutches, electronic door locks having bi-directional overrunning clutches, and methods of using the electronic door locks having bi-directional overrunning clutches.

BACKGROUND

Modern door locks include conventional mechanical door locks and electronic door locks. When the conventional mechanical door locks and the electronic door locks are combined for applications in smart homes, mechanical lock driving system and electronic lock driving system may interfere with each other when a user tries to operate such a combination lock. It is desirable to develop an overrunning clutch that allows the mechanical lock driving system and the electronic lock driving system to operate harmoniously without the interference between the mechanical lock driving system and the electronic lock driving system.

Therefore, heretofore unaddressed needs still exist in the art to address the aforementioned deficiencies and inadequacies.

SUMMARY

In one aspect, the present disclosure relates to a bi-directional overrunning clutch. In certain embodiments, the bi-directional overrunning clutch includes: a rotatable shaft, an inner wheel, an outer wheel, and an overrunning clutch mechanism. The inner wheel is fixedly attached to the rotatable shaft and the inner wheel receives a first torque through rotation of the rotatable shaft. The outer wheel is rotatable coaxially around the rotatable shaft. The outer wheel receives a second torque from an electrical driving mechanism. The overrunning clutch mechanism engages with the inner wheel and the outer wheel to transmit the first torque and the second torque to the rotatable shaft. When the outer wheel rotates at the second torque, the inner wheel and the rotatable shaft rotate along with the outer wheel. When the inner wheel rotates at the first torque, the outer wheel does not rotate along with the inner wheel and the rotatable shaft.

In certain embodiments, the outer wheel may rotate in a first direction, and in a second, opposite direction. In certain embodiments, the inner wheel may rotate in the first direction, and in the second, opposite direction. In one embodiment, the first direction is clockwise and the second direction is counter clockwise. When the outer wheel rotates at the second torque, the inner wheel and the rotatable shaft rotate along with the outer wheel in the same direction.

In certain embodiments, the overrunning clutch mechanism includes: a magnetic face plate, a first embedded straight edge and a second embedded straight edge, a magnetic pin, and the inner wheel. The first embedded straight edge and the second embedded straight edge form an acute angle on a first surface of the outer wheel. The magnetic pin attached magnetically and moveable on the magnetic face plate. The inner wheel defines one or more notches equally spaced around an outer edge of the inner wheel. When the outer wheel is rotating, one of the first and the second embedded straight edges presses the magnetic pin inward to engage the outer wheel with the inner wheel through one of the one or more notches to drive the inner wheel to rotate along with the outer wheel. When the inner wheel is rotating, one of the one or more notches pushes the magnetic pin outward to disengage the inner wheel from the outer wheel and the outer wheel does not rotate along with the inner wheel and the rotatable shaft.

In certain embodiments, the outer wheel receives the second torque from the electrical driving mechanism through at least one of a gear and a belt. The inner wheel receives the first torque through at least one of a gear, a belt, a knob, and a handle bar, and receives the second torque through the overrunning clutch mechanism.

In another aspect, the present disclosure relates to an electronic door lock having a bi-directional overrunning clutch. In certain embodiments, the electronic door lock includes: a first locking mechanism, a second locking mechanism, a third locking mechanism, and the bi-directional overrunning clutch. The first locking mechanism drives an inner wheel through a first torque to rotate a rotatable shaft to operate a locking device on a door by a user from an outside. The second locking mechanism drives the inner wheel through the first torque to operate the locking device on the door by the user from an inside. The third locking mechanism drives an outer wheel rotatable coaxially around the rotatable shaft through a second torque to electronically operate the locking device on the door by the user. When the outer wheel rotates at the second torque, the inner wheel and the rotatable shaft rotate along with the outer wheel. When the inner wheel rotates at the first torque, the outer wheel does not rotate along with the inner wheel and the rotatable shaft.

In certain embodiments, the inner wheel and the outer wheel can rotate in a first direction, and a second, opposite direction. When the outer wheel rotates at the second torque, the inner wheel and the rotatable shaft rotate along with the outer wheel in the same direction.

In certain embodiments, the bi-directional overrunning clutch: the rotatable shaft, the inner wheel, the outer wheel, and an overrunning clutch mechanism. The inner wheel is fixedly attached to the rotatable shaft. The inner wheel receives the first torque through rotation of the rotatable shaft. The outer wheel is rotatable coaxially around the rotatable shaft. The outer wheel receives the second torque from an electrical driving mechanism and rotates around the rotatable shaft. The overrunning clutch mechanism engages with the inner wheel and the outer wheel to transmit the first torque and the second torque to the rotatable shaft to operate the locking device on the door. When the outer wheel rotates at the second torque, the inner wheel and the rotatable shaft rotate along with the outer wheel. When the inner wheel rotates at the first torque, the outer wheel does not rotate along with the inner wheel and the rotatable shaft.

In certain embodiments, the overrunning clutch mechanism includes: a magnetic face plate, a first embedded straight edge and a second embedded straight edge, a magnetic pin, and the inner wheel. The first embedded straight edge and the second embedded straight edge form an acute angle on a first surface of the outer wheel. The magnetic pin attached magnetically and moveable on the magnetic face plate. The inner wheel defines one or more notches equally spaced around an outer edge of the inner wheel. When the outer wheel is rotating, one of the first and the second embedded straight edges presses the magnetic pin inward to engage the outer wheel with the inner wheel through one of the one or more notches to drive the inner wheel to rotate along with the outer wheel. When the inner wheel is rotating, one of the one or more notches pushes the magnetic pin outward to disengage the inner wheel from the outer wheel and the outer wheel does not rotate along with the inner wheel and the rotatable shaft.

In certain embodiments, the locking device includes a locking tongue. The locking tongue is in an extended position when the door is locked. The locking tongue is in a retracted position when the door is unlocked.

In certain embodiments, the first locking mechanism includes a first driving mechanism and a first transmission mechanism. The first driving mechanism generates the first torque and the first transmission mechanism transmits the first torque to the rotatable shaft. In certain embodiments, the first locking mechanism includes a first handle bar. The first handle bar is in horizontal position when the door is locked. When the user presses the first handle bar from the outside in the first direction, the rotatable shaft rotates in the first direction to retract the locking tongue and unlock the door.

In certain embodiments, the second locking mechanism includes a second driving mechanism, and a second transmission mechanism, wherein the second driving mechanism generates the first torque and the second transmission mechanism transmits the first torque to the rotatable shaft. In certain embodiments, the second locking mechanism includes a second handle bar. The second handle bar is in horizontal position when the door is locked. When the user presses the second handle bar from the inside in the first direction, the rotatable shaft rotates in the first direction to retract the locking tongue and unlock the door.

In certain embodiments, the third locking mechanism includes: a third transmission mechanism, a third driving mechanism, a second torque driving motor, and an electronic controller. The electronic controller controls the second torque driving motor and the second torque driving motor generates the second torque. The electronic controller includes at least: a communication module, a user authentication module, and a lock control module. The user uses the communication module and the user authentication module to operate the electronic door lock through the lock control module to provide the second torque to the outer wheel through the third driving mechanism and the third transmission mechanism of the third locking mechanism.

In certain embodiments, the user communicates with the communication module through at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network. The user authentication module uses at least one of a keypad, a card reader, a RFID sensor, a face ID authentication device, a finger print authentication device, a finger vein authentication device, and any combination of these devices for user authentication.

In yet another aspect, the present disclosure relates to a method of operating an electronic door lock having a bi-directional overrunning clutch. In certain embodiments, the method includes: installing, by a user, the electronic door lock on a door. The electronic door lock includes: a first locking mechanism to be operated from an outside of the door, a second locking mechanism to be operated from an inside of the door, and a third locking mechanism to be operated by the user electronically. The method also includes several options to operate the electronic door lock.

In one embodiment, the user operates the electronic door lock using the first locking mechanism when the user opens the door from the outside. The user provides a first torque to a rotatable shaft and an inner wheel fixedly attached to the rotatable shaft and turns the rotatable shaft in a first direction to unlock the electronic door lock.

In another embodiment, the user operates the electronic door lock using the second locking mechanism when the user opens the door from the inside. The user provides the first torque to the rotatable shaft and the inner wheel fixedly attached to the rotatable shaft and turns the rotatable shaft in the first direction to unlock the electronic door lock.

In yet another embodiment, the user operates the electronic door lock using the third locking mechanism when the user opens the door electronically through an electronic controller. The electronic controller controls a second torque driving motor to provide a second torque to an outer wheel rotatable coaxially around the rotatable shaft, to engage the outer wheel with the inner wheel and to turn the rotatable shaft in a first direction to unlock the electronic door lock through an overrunning clutch mechanism. In certain embodiments, the electronic controller includes at least a communication module, a user authentication module, and a lock control module. The user uses the communication module and the user authentication module to operate the electronic door lock through the lock control module to provide the second torque to the outer wheel through a third driving mechanism and a third transmission mechanism of the third locking mechanism.

In certain embodiments, the user communicates with the communication module through at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network. The user authentication module uses at least one of a keypad, a card reader, a RFID sensor, a face ID authentication device, a finger print authentication device, a finger vein authentication device, and any combination of these devices for user authentication.

In certain embodiments, the overrunning clutch mechanism includes: a magnetic face plate, a first embedded straight edge and a second embedded straight edge, a magnetic pin, and the inner wheel. The first embedded straight edge and the second embedded straight edge form an acute angle on a first surface of the outer wheel. The magnetic pin attached magnetically and moveable on the magnetic face plate. The inner wheel defines one or more notches equally spaced around an outer edge of the inner wheel. When the outer wheel is rotating, one of the first and the second embedded straight edges presses the magnetic pin inward to engage the outer wheel with the inner wheel through one of the one or more notches to drive the inner wheel to rotate along with the outer wheel. When the inner wheel is rotating, one of the one or more notches pushes the magnetic pin outward to disengage the inner wheel from the outer wheel and the outer wheel does not rotate along with the inner wheel and the rotatable shaft.

These and other aspects of the present disclosure will become apparent from the following description of the preferred embodiment taken in conjunction with the following drawings, although variations and modifications therein may be implemented without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein:

FIG. 7 shows the magnetic pin is pushed by one edge of the outer wheel when the outer wheel is rotating in a second direction according to certain embodiments of the present disclosure;

FIG. 8 shows the magnetic pin is pushed into a nearby notch to engage the inner wheel and drive the inner wheel to rotate along with the outer wheel when the outer wheel is rotating in the second direction according to certain embodiments of the present disclosure;

DETAILED DESCRIPTION

Figure 1:
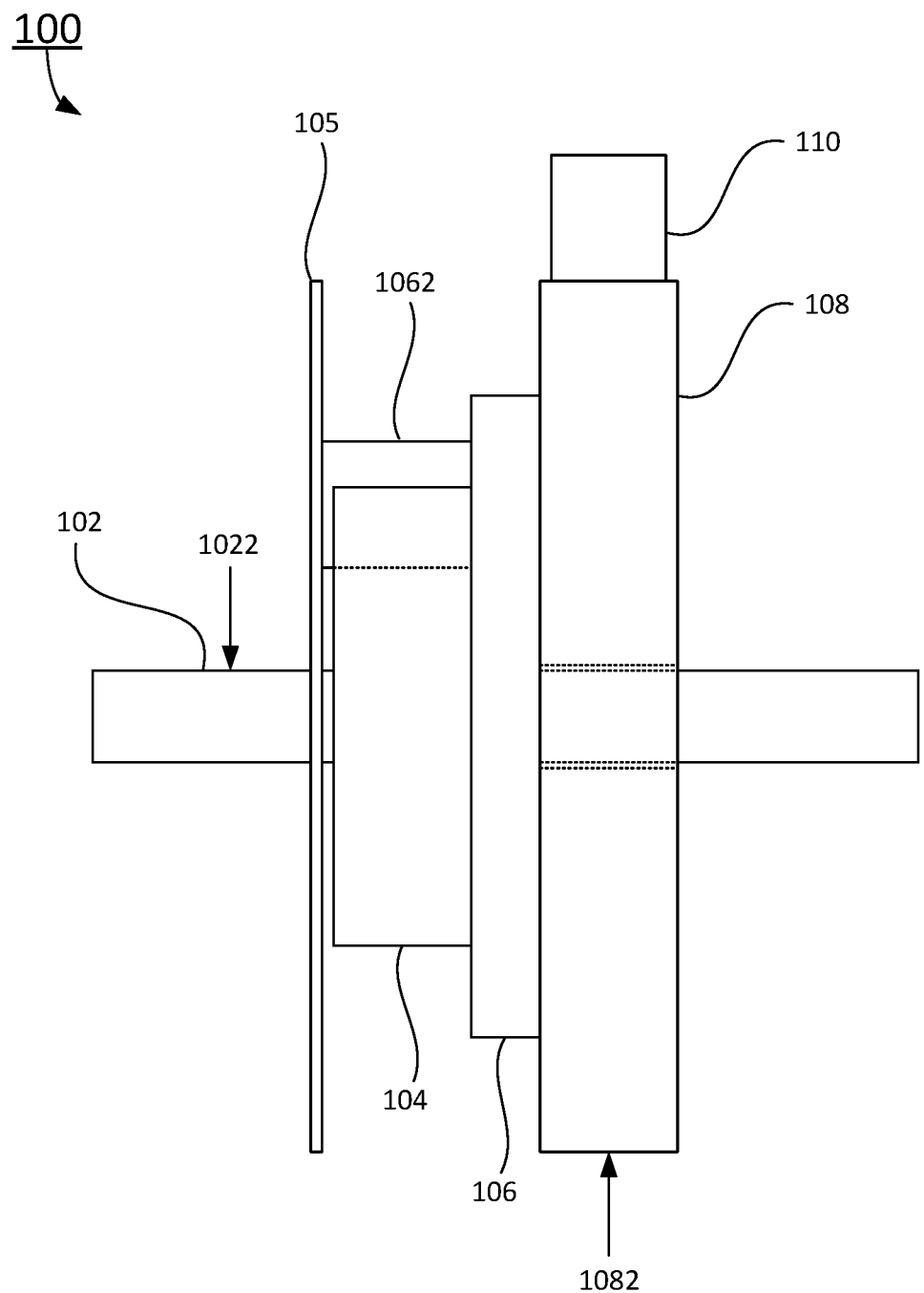
FIG. 1 illustrates a bi-directional overrunning clutch according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or non-conventionally) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 2:
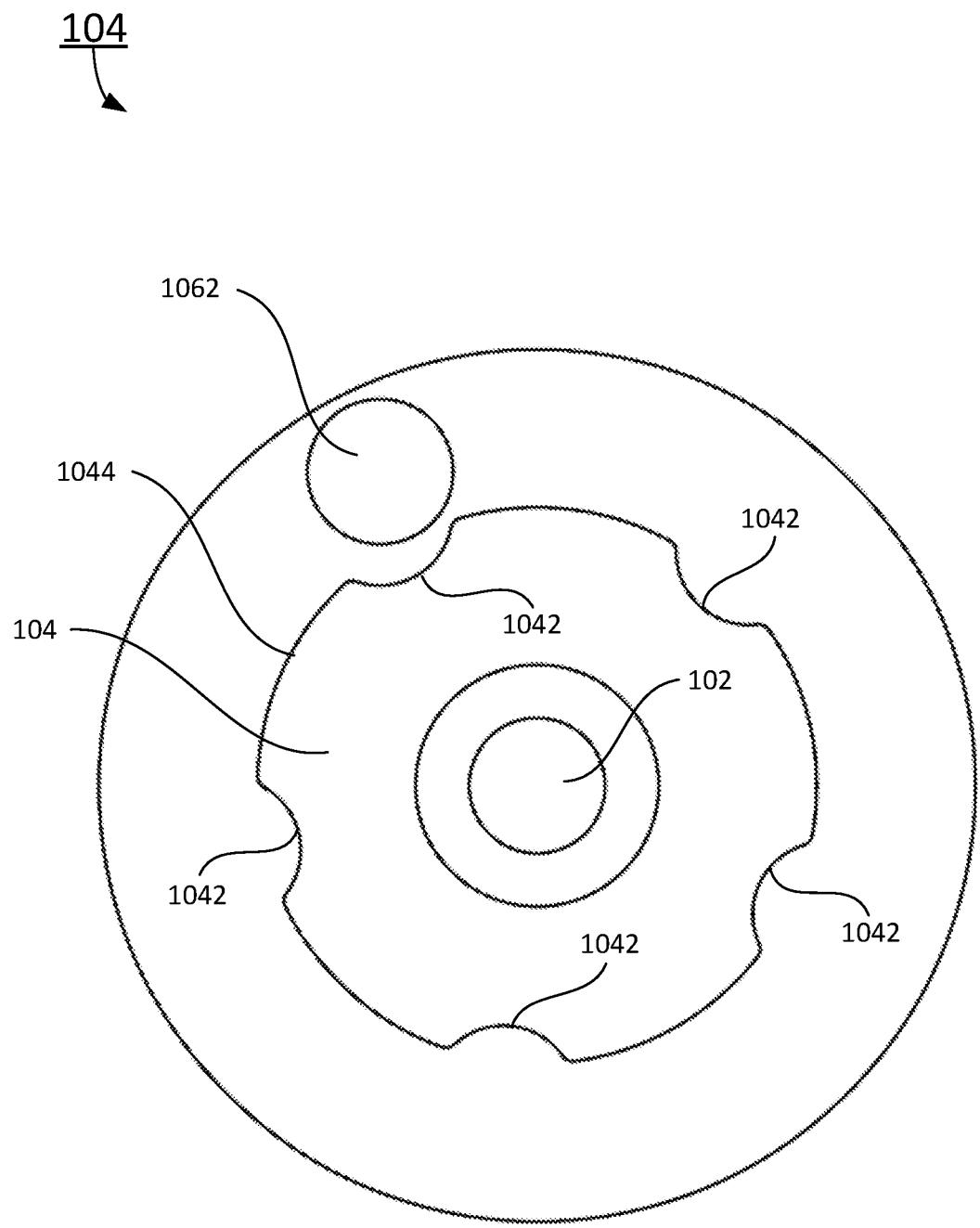
FIG. 2 shows a front view of an inner wheel of the bi-directional overrunning clutch according to one embodiment of the present disclosure.

Referring now to FIGS. 1-12, in one aspect, the present disclosure relates to a bi-directional overrunning clutch 100. In certain embodiments, as shown in FIG. 1, the bi-directional overrunning clutch 100 includes: a rotatable shaft 102, an inner wheel 104, an outer wheel 108, and an overrunning clutch mechanism 106. The inner wheel 104 is fixedly attached to the rotatable shaft 102 and the inner wheel 104 receives a first torque 1022 through rotation of the rotatable shaft 102. In one embodiment, as shown in FIG. 2, the inner wheel 104 defines five notches 1042 around the outer edge 1044 of the inner wheel 104. In certain embodiments, the inner wheel 104 receives a second torque 1082 through the overrunning clutch mechanism 106 from the outer wheel 108.

Figure 3:
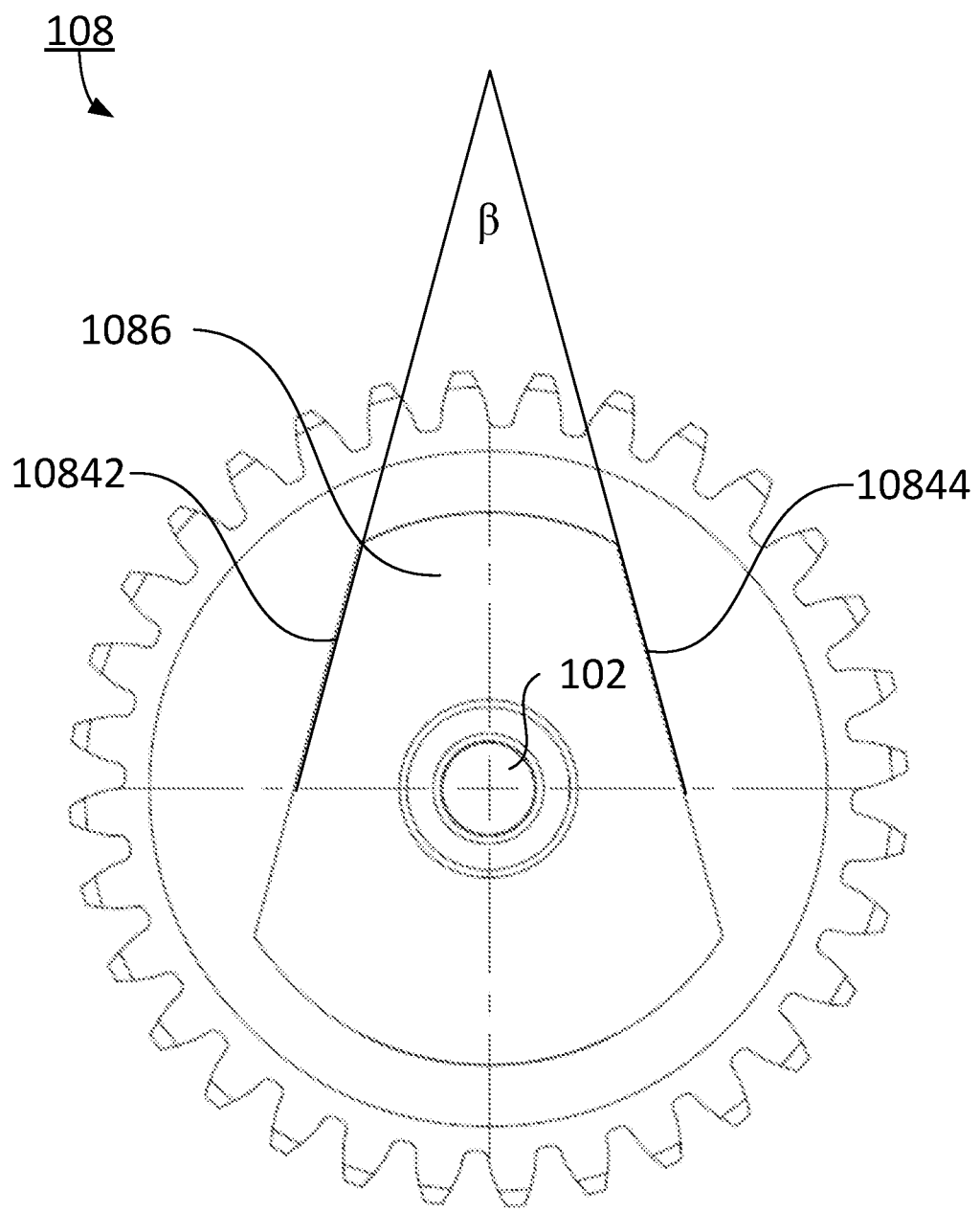
FIG. 3 shows a front view of an outer wheel of the bi-directional overrunning clutch according to certain embodiments of the present disclosure.

In certain embodiments, as shown in FIG. 3, the outer wheel 108 is rotatable coaxially around the rotatable shaft 102. The outer wheel 108 receives a second torque 1082 from an electrical driving mechanism 110, as shown in FIG. 1, through gears around an outer edge of the outer wheel 108. In certain embodiments, the outer wheel 108 includes a first surface 1086. In one embodiment, the outer wheel 108 includes a first embedded straight edge 10842 and a second embedded straight edge 10844. The first embedded straight edge 10842 and the second embedded straight edge 10844 form an acute angle β on the first surface 1086, as shown in FIG. 3.

Figure 4:
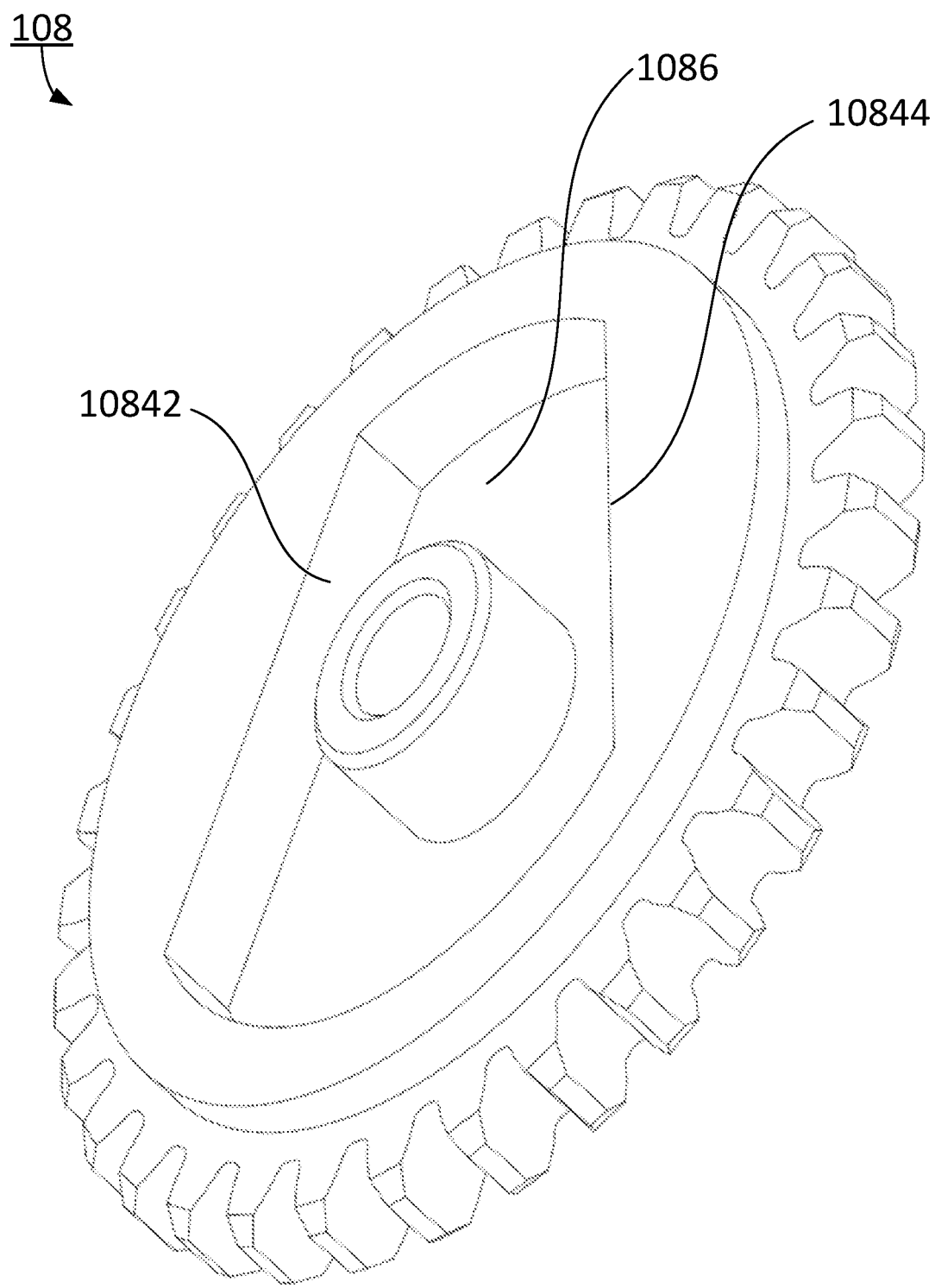
FIG. 4 shows a perspective view of the outer wheel of the bi-directional overrunning clutch according to certain embodiments of the present disclosure.
Figure 6:
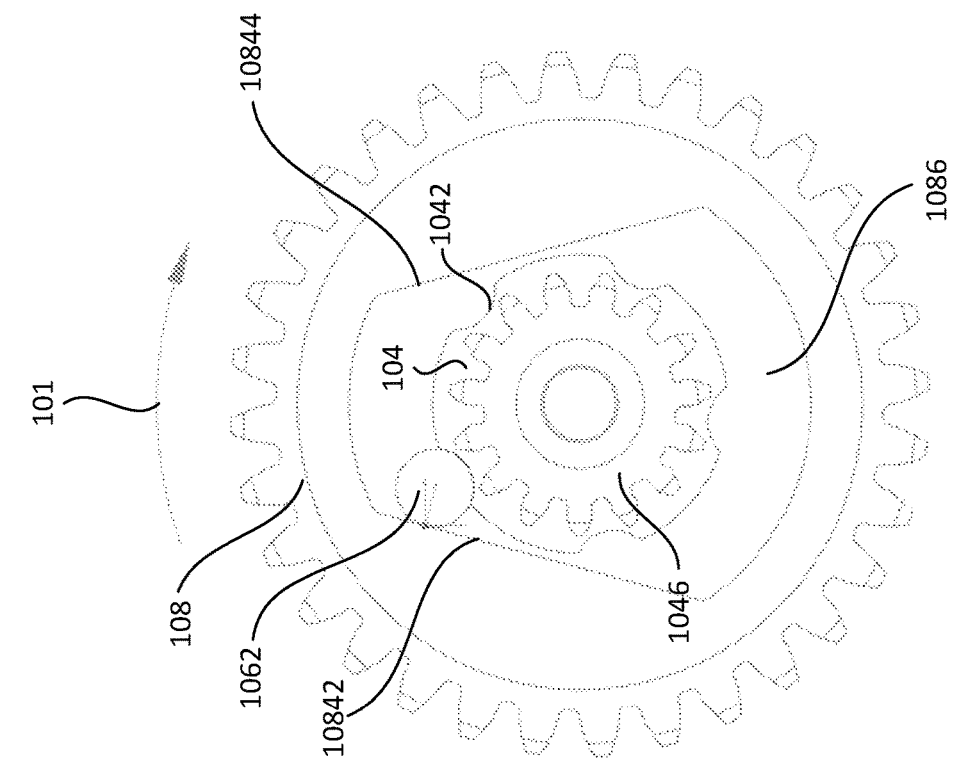
FIG. 6 shows the magnetic pin is pushed into a nearby notch to engage the inner wheel and drive the inner wheel to rotate along with the outer wheel when the outer wheel is rotating in the first direction according to certain embodiments of the present disclosure.
Figure 5:
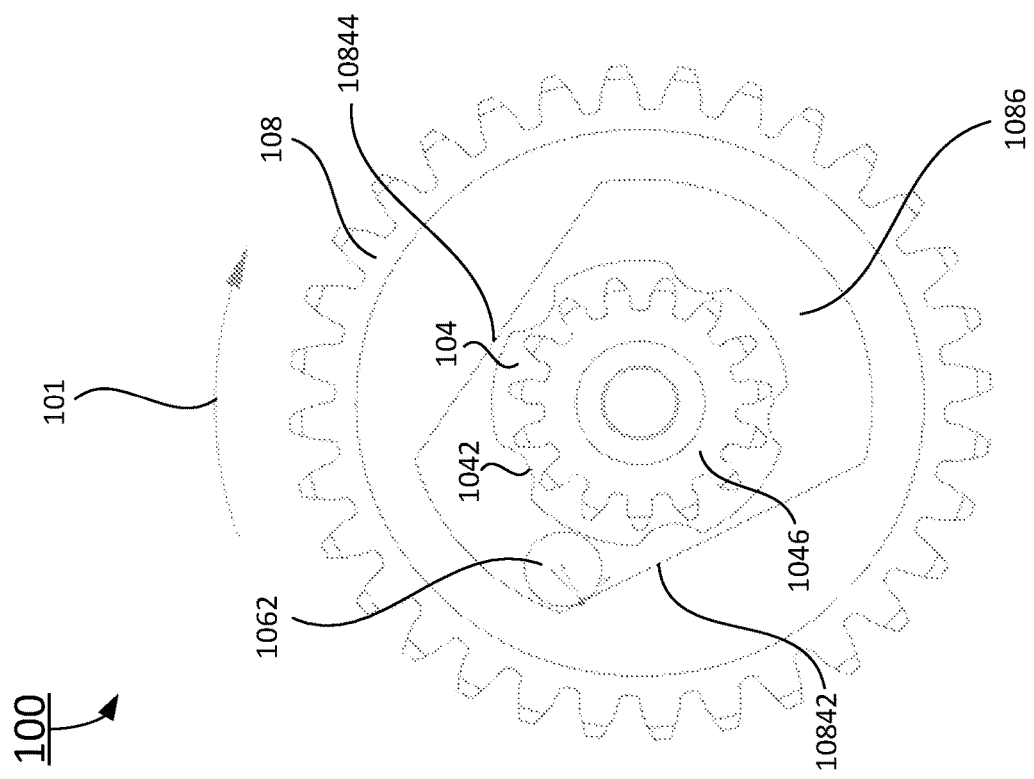
FIG. 5 shows a magnetic pin is pushed by one edge of the outer wheel when the outer wheel is rotating in a first direction according to certain embodiments of the present disclosure.
Figure 10:
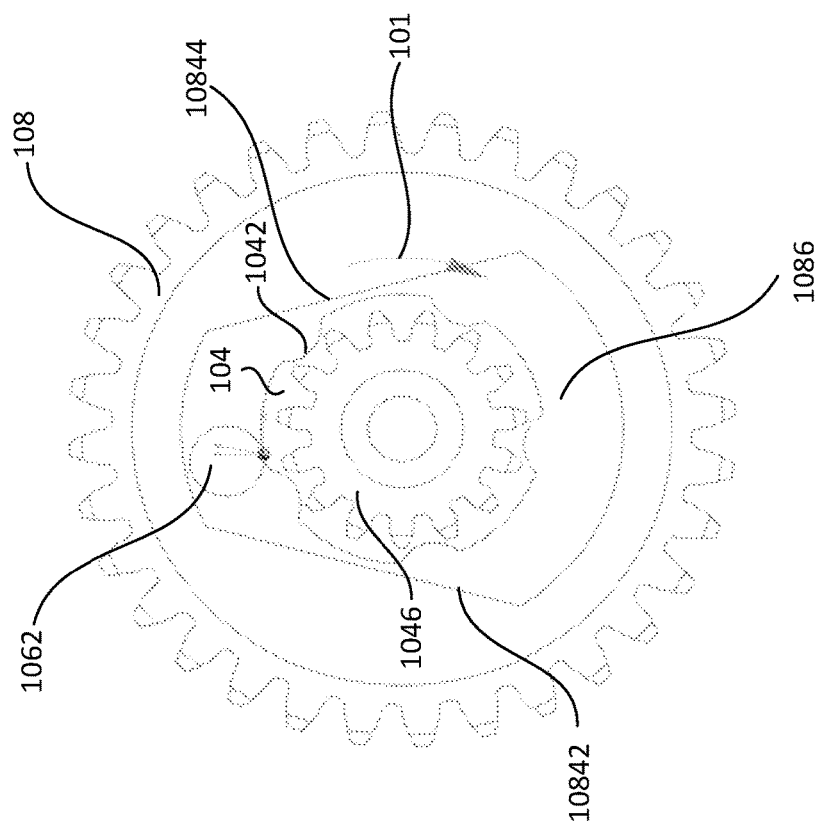
FIG. 10 shows the magnetic pin is pushed out by a nearby notch and disengaged the outer wheel from the inner wheel so that the outer wheel does not rotate along with the inner wheel when the inner wheel is rotating in the first direction according to certain embodiments of the present disclosure.
Figure 9:
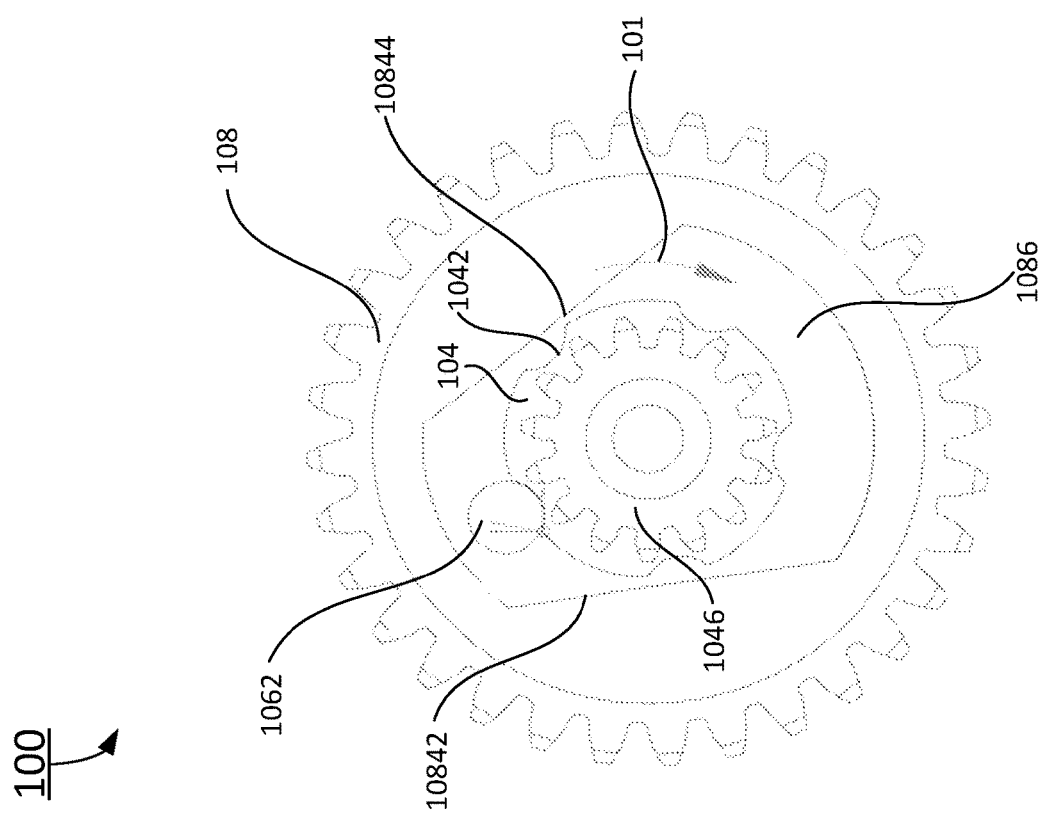
FIG. 9 shows the magnetic pin is pushed by one of notches along the outer edge of the inner wheel when the inner wheel is rotating in the first direction according to certain embodiments of the present disclosure.
Figure 12:
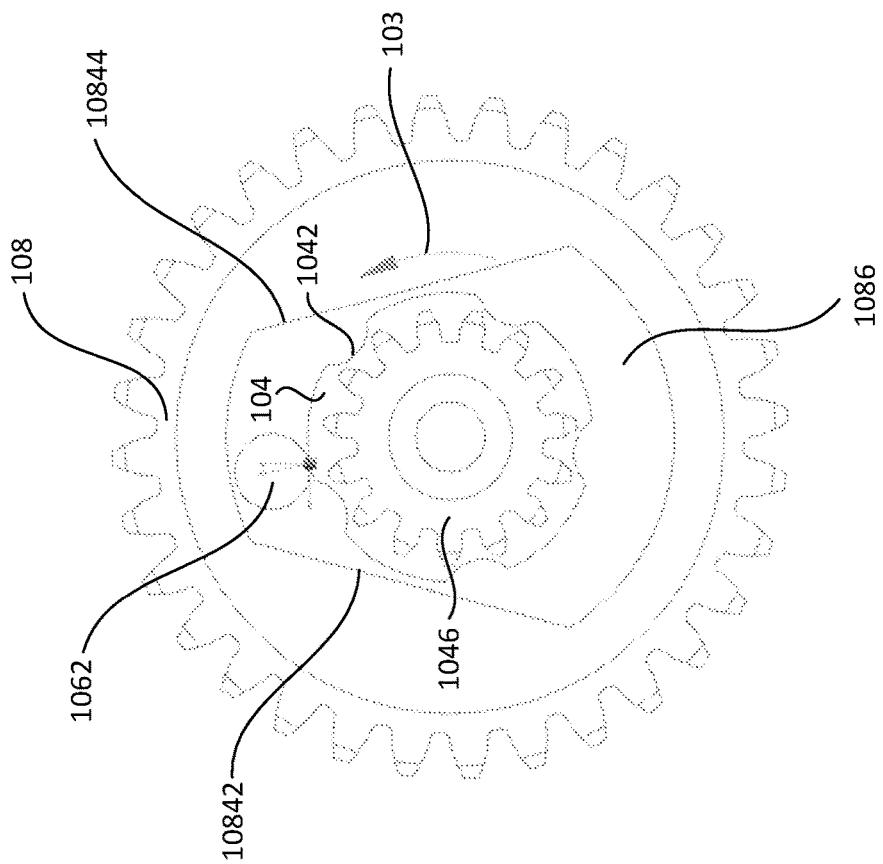
FIG. 12 shows the magnetic pin is pushed out by a nearby notch and disengaged the outer wheel from the inner wheel so that the outer wheel does not rotate along with the inner wheel when the inner wheel is rotating in the second direction according to certain embodiments of the present disclosure.
Figure 11:
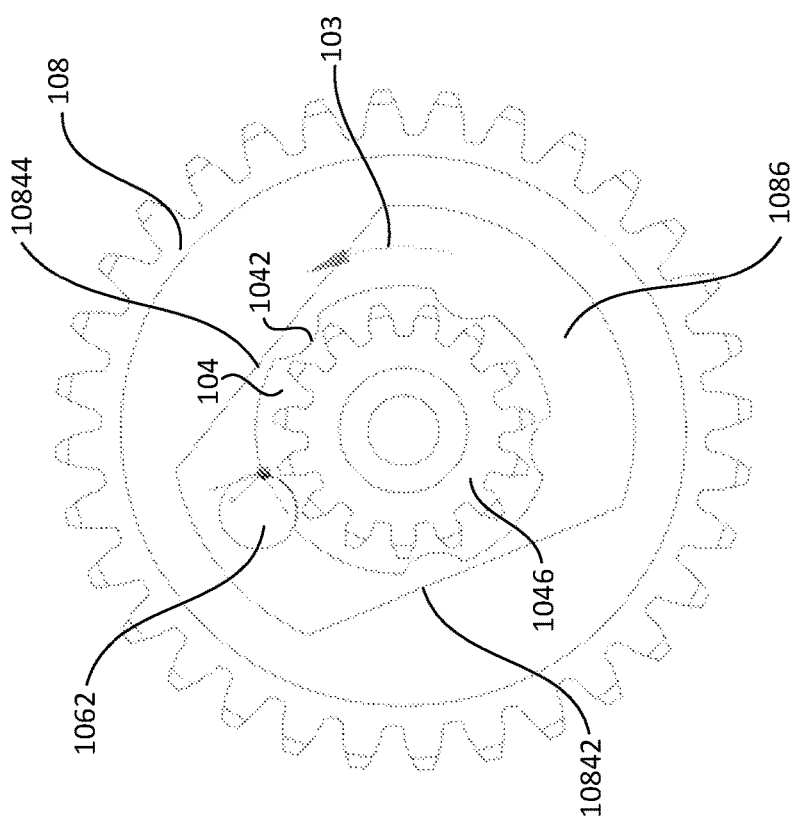
FIG. 11 shows the magnetic pin is pushed by one of notches along the outer edge of the inner wheel when the inner wheel is rotating in the second direction according to certain embodiments of the present disclosure.

In certain embodiments, as shown in FIGS. 2-4, the overrunning clutch mechanism 106 includes: a magnetic face plate 105, the first embedded straight edge 10842 and the second embedded straight edge 10844, a magnetic pin 1062, and the inner wheel 104. Each of the first embedded straight edge 10842 and the second embedded straight edge 10844 forms the acute angle β on the first surface 1086 of the outer wheel 108. The magnetic pin 1062 is attached magnetically and moveable on the magnetic face plate 105. The inner wheel 104 defines one or more notches 1042 equally spaced around an outer edge 1044 of the inner wheel 104. When the outer wheel 108 is rotating in a first direction, the first embedded straight edge 10842 presses the magnetic pin 1062 inward to engage the outer wheel 108 with the inner wheel 104 through one of the one or more notches 1042 to drive the inner wheel 104 to rotate along with the outer wheel 108 in the first direction. When the outer wheel 108 is rotating in a second direction, the second embedded straight edge 10844 presses the magnetic pin 1062 inward to engage the outer wheel 108 with the inner wheel 104 through one of the one or more notches 1042 to drive the inner wheel 104 to rotate along with the outer wheel 108 in the second direction. When the inner wheel 104 is rotating, one of the one or more notches 1042 pushes the magnetic pin 1062 outward to disengage the inner wheel 104 from the outer wheel 108, and therefore, the outer wheel 108 does not rotate along with the inner wheel 104 and the rotatable shaft 102. In certain embodiments, the outer wheel 108 may rotate in the first direction 101, as shown in FIGS. 5 and 6, and in the second, opposite direction 103, as shown in FIGS. 7 and 8. In certain embodiments, the inner wheel 104 may rotate in the first direction 101, as shown in FIGS. 9 and 10, and in the second, opposite direction 103, as shown in FIGS. 11 and 12. In these embodiments, the first direction 101 is clockwise and the second direction 103 is counter clockwise. In certain embodiments, when the outer wheel 108 rotates at the second torque 1082, the inner wheel 104 and the rotatable shaft 102 rotate along with the outer wheel 108 in the same direction. When the inner wheel 104 rotates at the first torque 1022, the outer wheel 108 does not rotate along with the inner wheel 104 in the same direction.

In certain embodiments, as shown in FIGS. 5 and 6, when the outer wheel 108 is driven and rotating in the first direction 101 (clockwise), the first embedded straight edge 10842 pushes the magnetic pin 1062 in the first direction 101, and when the magnetic pin 1062 falls into a nearby notch 1042, the first embedded straight edge 10842 pushes the magnetic pin 1062 inward to engage the outer wheel 108 with the inner wheel 104 through the nearby notch 1042 to drive the inner wheel 104 to rotate along with the outer wheel 108 in the same direction. Therefore, the overrunning clutch mechanism 106 engages the inner wheel 104 with the outer wheel 108 to transmit the second torque 1082 to the rotatable shaft 102.

In certain embodiments, as shown in FIGS. 7 and 8, when the outer wheel 108 is driven and rotating in the second direction 103 (counter clockwise), the second embedded straight edge 10844 pushes the magnetic pin 1062 in the second direction 103, and when the magnetic pin 1062 falls into a nearby notch 1042, the second embedded straight edge 10844 pushes the magnetic pin 1062 inward to engage the outer wheel 108 with the inner wheel 104 through the nearby notch 1042 to drive the inner wheel 104 to rotate along with the outer wheel 108 in the same direction. Therefore, the overrunning clutch mechanism 106 engages the inner wheel 104 with the outer wheel 108 to transmit the second torque 1082 to the rotatable shaft 102.

Therefore, when the outer wheel 108 rotates in either directions, the overrunning clutch mechanism 106 engages the inner wheel 104 with the outer wheel 108 to transmit the second torque 1082 to the rotatable shaft 102.

In certain embodiments, as shown in FIGS. 9 and 10, when the inner wheel 104 is driven and rotating in the first direction 101 (clockwise), the magnetic pin 1062 falls into a nearby notch 1042, and as the inner wheel 104 rotates, the edge of the nearby notch 1042 pushes the magnetic pin 1062 outward and disengages the inner wheel 104 from the outer wheel 108, thus, the outer wheel 104 does not rotate along with the inner wheel 104 and the rotatable shaft 102. Therefore, the overrunning clutch mechanism 106 disengages the inner wheel 104 from the outer wheel 108 and transmits the first torque 1022 only to the rotatable shaft 102.

In certain embodiments, as shown in FIGS. 11 and 12, when the inner wheel 104 is driven and rotating in the second direction 103 (counter clockwise), the magnetic pin 1062 falls into another nearby notch 1042, and as the inner wheel 104 rotates, the edge of the nearby notch 1042 pushes the magnetic pin 1062 outward and disengages the inner wheel 104 from the outer wheel 108, thus, the outer wheel 104 does not rotate along with the inner wheel 104 and the rotatable shaft 102. Therefore, the overrunning clutch mechanism 106 disengages the inner wheel 104 from the outer wheel 108 and transmits the first torque 1022 only to the rotatable shaft 102.

Therefore, when the inner wheel 104 rotates in both directions, the overrunning clutch mechanism 106 disengages the inner wheel 104 from the outer wheel 108 to transmit the second torque 1082 to the rotatable shaft 102.

In certain embodiments, when the bi-directional overrunning clutch 100 is used, rotatable shaft 102 can be driven by the inner wheel 104 through the first torque 1022 and the outer wheel 108 through the second torque 1082, separately and independently.

Figure 13:
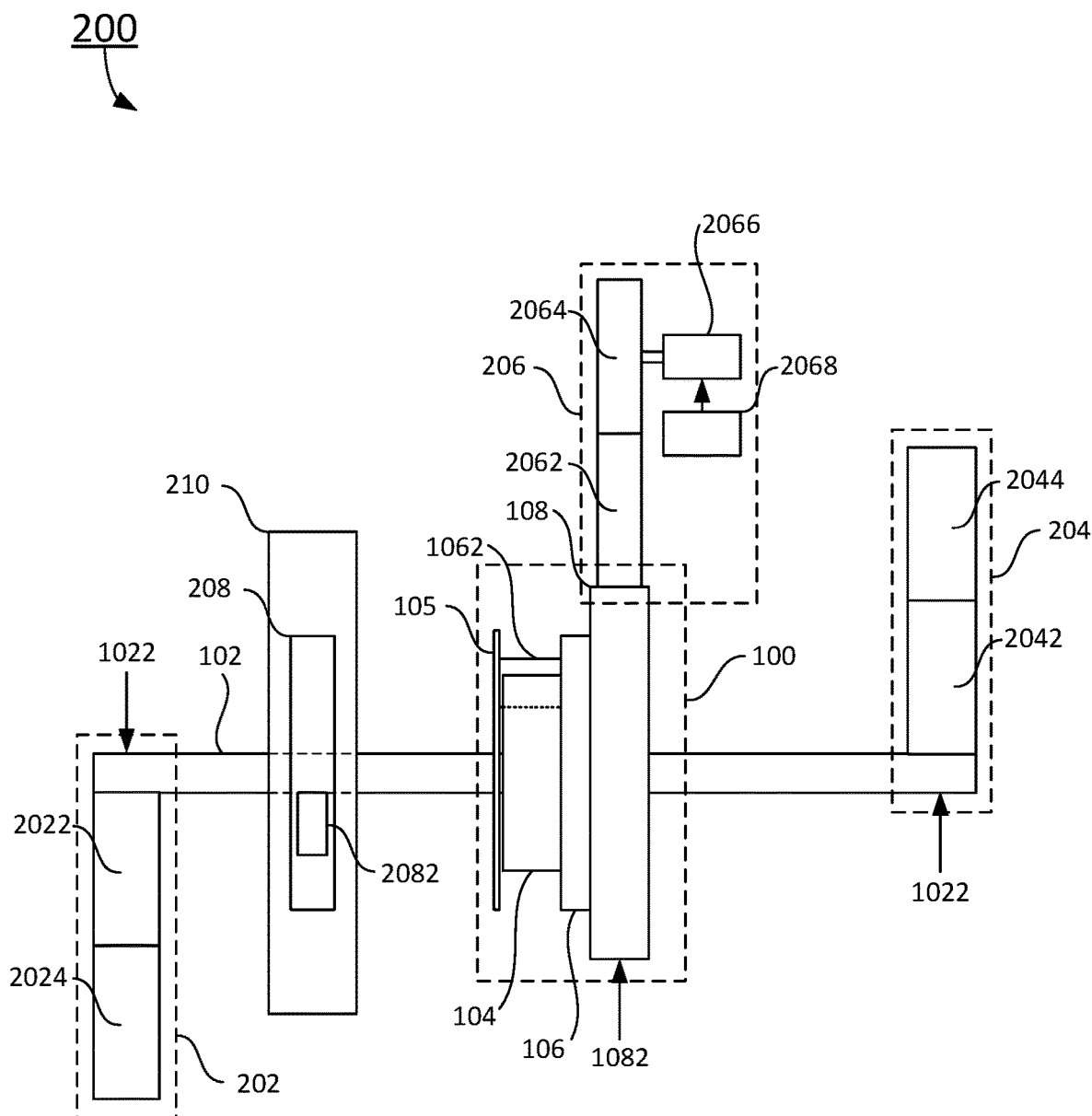
FIG. 13 shows an electronic door lock having the bi-directional overrunning clutch cross-sectional view of a three-dimensional finger vein imaging device according to certain embodiments of the present disclosure.

In certain embodiments, as shown in FIG. 13, the outer wheel 108 receives the second torque 1082 from the electrical driving mechanism 110 through at least one of a gear and a belt. The inner wheel 104 receives the first torque 1022 through at least one of a gear shown in the second inner wheel 1046, a belt around the rotatable shaft 102, a knob, and a handle bar 202. The inner wheel 104 receives the second torque 1082 through the overrunning clutch mechanism 106.

Figure 14:
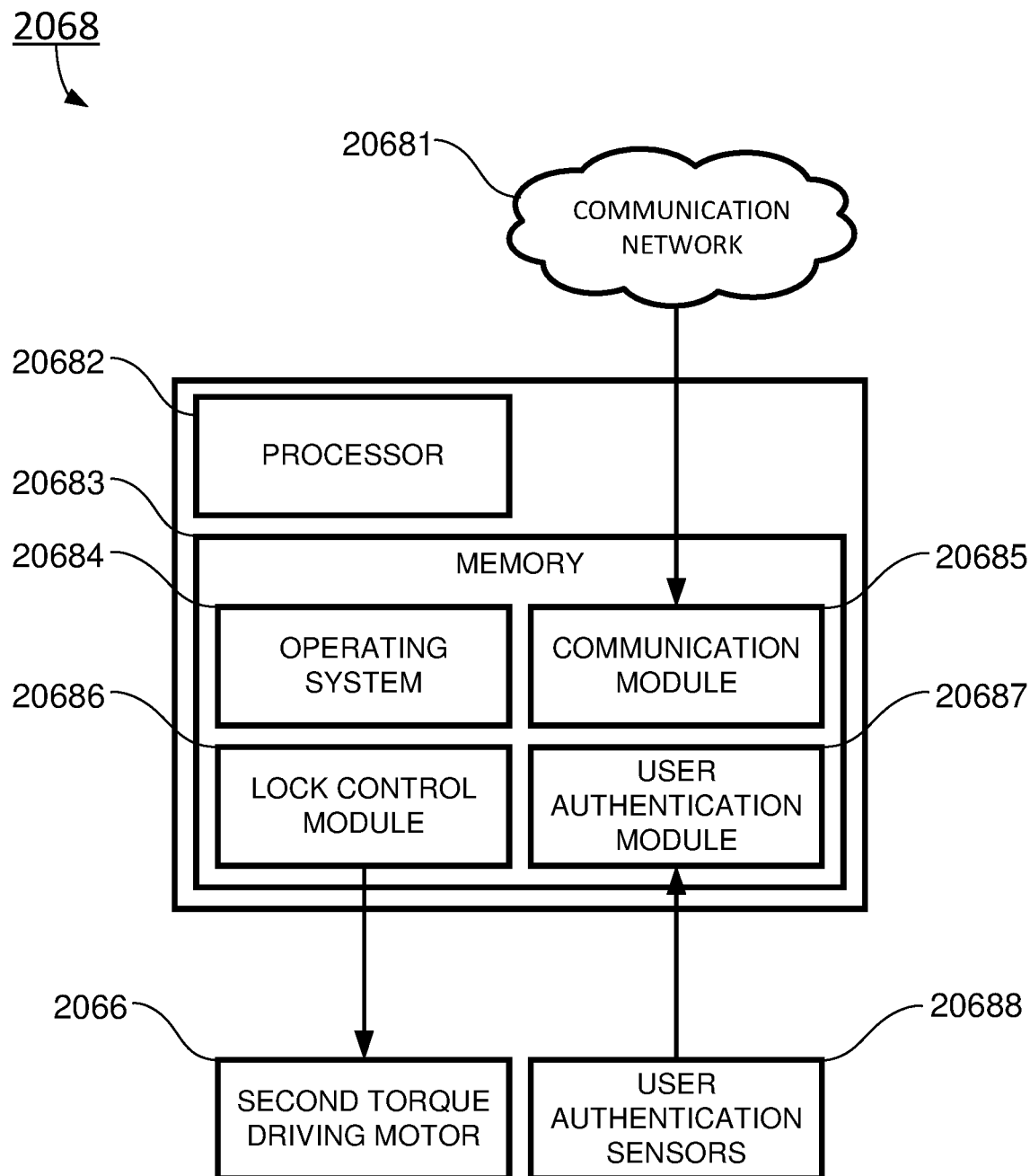
FIG. 14 shows a block diagram of an electronic controller of the electronic door lock according to certain embodiments of the present disclosure.

In another aspect, as shown in FIGS. 13 and 14, the present disclosure relates to an electronic door lock 200 having a bi-directional overrunning clutch 100. In certain embodiments, the electronic door lock 200 includes: a first locking mechanism 202, a second locking mechanism 204, a third locking mechanism 206, and the bi-directional overrunning clutch 100. The first locking mechanism 202 drives an inner wheel 104 through a first torque 1022 to rotate a rotatable shaft 102 to operate a locking device 208 on a door 210 by a user from an outside of the door 210. The second locking mechanism 204 drives the inner wheel 104 through the first torque 1022 to operate the locking device 208 on the door 210 by the user from an inside of the door 210. The third locking mechanism 206 drives an outer wheel 108 rotatable coaxially around the rotatable shaft 102 through a second torque 1082 to electronically operate the locking device 208 on the door 210 by the user.

In certain embodiments, the outer wheel 108 may rotate in a first direction 101, as shown in FIGS. 5 and 6, and in a second, opposite direction 103, as shown in FIGS. 7 and 8. In certain embodiments, the inner wheel 104 may rotate in the first direction 101, as shown in FIGS. 9 and 10, and in the second, opposite direction 103, as shown in FIGS. 11 and 12. In these embodiments, the first direction 101 is clockwise and the second direction 103 is counter clockwise. In certain embodiments, when the outer wheel 108 rotates at the second torque 1082, the inner wheel 104 and the rotatable shaft 102 rotate along with the outer wheel 108 in the same direction. When the inner wheel 104 rotates at the first torque 1022, the outer wheel 108 does not rotate along with the inner wheel 104 in the same direction.

In certain embodiments, as shown in FIG. 1, the bi-directional overrunning clutch 100 includes: the rotatable shaft 102, the inner wheel 104, the outer wheel 108, and an overrunning clutch mechanism 106. The inner wheel 104 is fixedly attached to the rotatable shaft 102 and the inner wheel 104 receives the first torque 1022 through rotation of the rotatable shaft 102. In one embodiment, as shown in FIG. 2, the inner wheel 104 defines five notches 1042 around the outer edge 1044 of the inner wheel 104. In certain embodiments, the inner wheel 104 receives a second torque 1082 through the overrunning clutch mechanism 106 from the outer wheel 108.

In certain embodiments, as shown in FIG. 3, the outer wheel 108 is rotatable coaxially around the rotatable shaft 102. The outer wheel 108 receives the second torque 1082 from an electrical driving mechanism 110, as shown in FIG. 1, through gears around an outer edge of the outer wheel 108. In a first side, the outer wheel 108 includes a first embedded straight edge 10842 and a second embedded straight edge 10844, as shown in FIGS. 3 and 4. The first and the second embedded straight edges 10842 and 10844 form an acute angle β, as shown in FIG. 3, on a first surface 1086 of the outer wheel 108.

In certain embodiments, as shown in FIGS. 2-4, the overrunning clutch mechanism 106 includes: a magnetic face plate 105, a first embedded straight edge 10842 and a second embedded straight edge 10844, a magnetic pin 1062, and the inner wheel 104. The first embedded straight edge and the second embedded straight edge form an acute angle β on the first surface 1086 of the outer wheel 108. The magnetic pin 1062 is attached magnetically and moveable on the magnetic face plate 105. The inner wheel 104 defines one or more notches 1042 equally spaced around an outer edge 1044 of the inner wheel 104. When the outer wheel 108 is rotating, one of the first embedded straight edge 10842 and the second embedded straight edge 10844 presses the magnetic pin 1062 inward to engage the outer wheel 108 with the inner wheel 104 through one of the one or more notches 1042 to drive the inner wheel 104 to rotate along with the outer wheel 108. When the inner wheel 104 is rotating, one of the one or more notches 1042 pushes the magnetic pin 1062 outward to disengage the inner wheel 104 from the outer wheel 108, and therefore, the outer wheel 108 does not rotate along with the inner wheel 104 and the rotatable shaft 102.

In certain embodiments, when the outer wheel 108 rotates at the second torque 1082, the inner wheel 104 and the rotatable shaft 102 rotate along with the outer wheel 108. When the inner wheel 104 rotates at the first torque 1022, the outer wheel 108 does not rotate along with the inner wheel 104 and the rotatable shaft 102.

In certain embodiments, when the bi-directional overrunning clutch 100 is used in the electronic door lock 200, the rotatable shaft 102 can be separately and independently drive by the first torque 1022 through the inner wheel 104 and the second torque 1082 through the outer wheel 108.

In certain embodiments, as shown in FIG. 13, the locking device 208 includes a locking tongue 2082. In one embodiment, the locking tongue 2082 is in an extended position when the door 210 is locked. The locking tongue 2082 is in a retracted position when the door 210 is unlocked.

In certain embodiments, the first locking mechanism 202 includes a first driving mechanism 2024 and a first transmission mechanism 2022. The first driving mechanism 2024 generates the first torque 1022 and the first transmission mechanism 2022 transmits the first torque 1022 to the rotatable shaft 102. In certain embodiments, the first locking mechanism 202 includes a first handle bar 202. The first handle bar 202 is in horizontal position when the door 210 is locked. When the user presses the first handle bar 202 from the outside in the first direction, the rotatable shaft 102 rotates in the first direction to retract the locking tongue 2082 and unlock the door 210.

In certain embodiments, the second locking mechanism 204 includes a second driving mechanism 2044, and a second transmission mechanism 2042, wherein the second driving mechanism 2044 generates the first torque 1022 and the second transmission mechanism 2042 transmits the first torque 1022 to the rotatable shaft 102. In certain embodiments, the second locking mechanism 204 includes a second handle bar 204. The second handle bar 204 is in horizontal position when the door 210 is locked. When the user presses the second handle bar 204 from the inside in the first direction, the rotatable shaft 102 rotates in the first direction to retract the locking tongue 2082 and unlock the door 210.

In certain embodiments, the third locking mechanism 206 includes: a third transmission mechanism 2062, a third driving mechanism 2064, a second torque driving motor 2066, and an electronic controller 2068. The electronic controller 2068 controls the second torque driving motor 2066 and the second torque driving motor 2066 generates the second torque 1082.

In certain embodiments, as shown in FIG. 14, the electronic controller 2068 includes: a processor 20682 and a non-volatile memory 20683. The non-volatile memory 20683 includes an operating system 20684, a communication module 20685, a lock control module 20686, and a user authentication module 20687.

In certain embodiments, the user uses the communication module 20682 to operate the electronic door lock 200 through the lock control module 20686 to provide the second torque 1082 to the outer wheel 108 through the third driving mechanism 2064 and the third transmission mechanism 2062 of the third locking mechanism 206. In certain embodiments, a user may use one or more Application Programs (APPs) on a smart phone and a communication network 20681 to operate the electronic door lock 200. The communication network 20681 includes at least one of: a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network.

In certain embodiments, the user uses the user authentication module 20684 to operate the electronic door lock 200 through the lock control module 20686 to provide the second torque 1082 to the outer wheel 108 through the third driving mechanism 2064 and the third transmission mechanism 2062 of the third locking mechanism 206.

In certain embodiments, the user authentication module 20687 receives user authentication signals from one or more user authentication sensors 20688. In one embodiment, the user authentication sensors 20688 is a keypad and the user enters a code to open the electronic door lock 200. In another embodiment, the user authentication sensors 20688 is a card reader and the user uses a keycard or a RFID card to open the electronic door lock 200. In yet another embodiment, the user authentication sensors 20688 is a FaceID authentication device and when the user passes through the FaceID authentication device, the user authentication module 20687 authenticates the user and determines whether to open the electronic door lock 200.

In certain embodiments, the user authentication sensors 20688 includes a finger print authentication device. When the user put a predetermined finger into the finger print authentication device, the finger print authentication device obtains the finger print images and sends the obtained finger print images to the user authentication module 20687. The user authentication module 20687 authenticates the user and determines whether to open the electronic door lock 200.

In certain embodiments, the user authentication sensors 20688 includes a finger vein authentication device. When the user put a predetermined finger into the finger vein authentication device, the finger vein authentication device obtains the finger vein pattern images and sends the obtained finger vein pattern images to the user authentication module 20687. The user authentication module 20687 authenticates the user and determines whether to open the electronic door lock 200.

Figure 15:
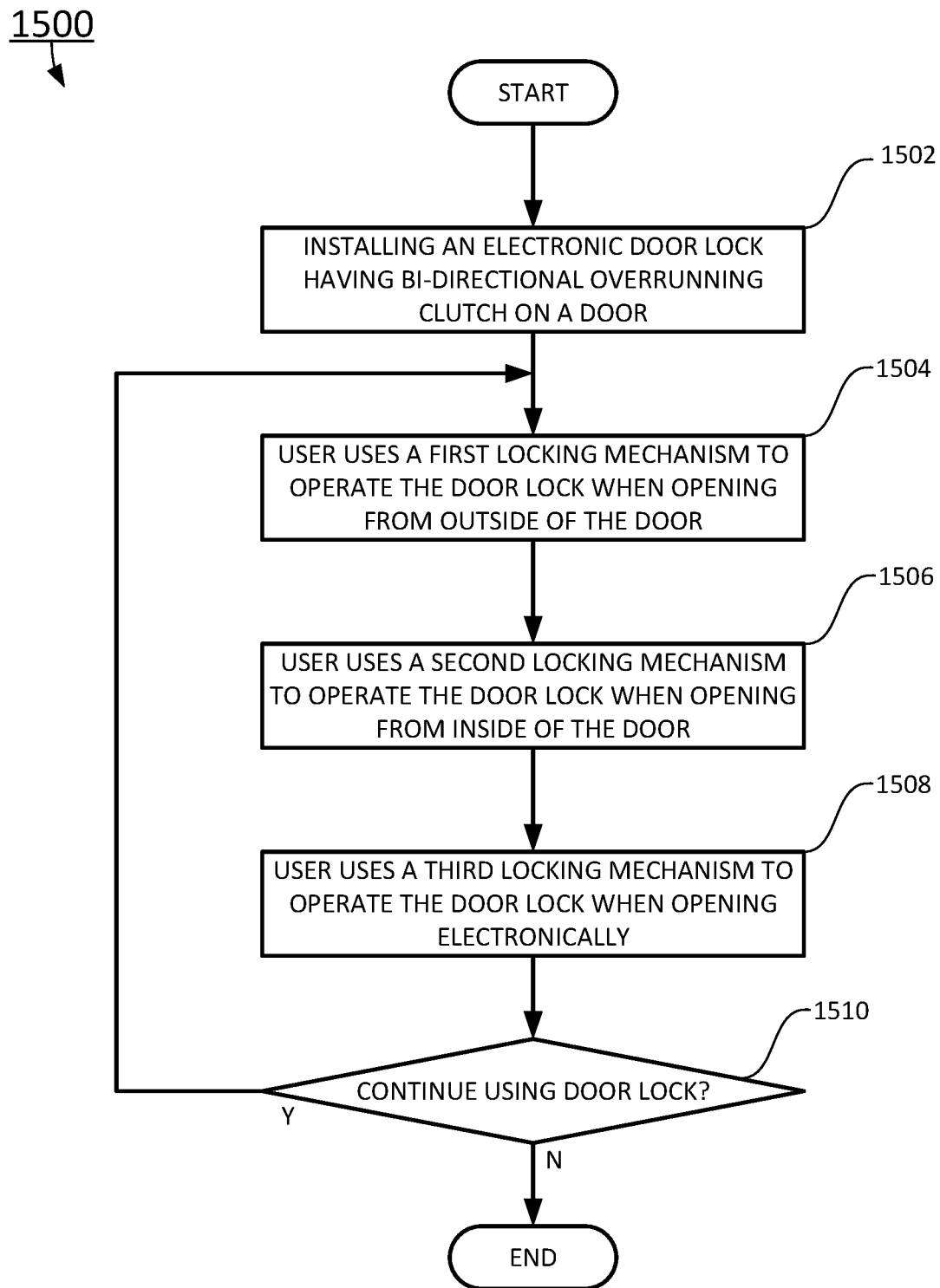
FIG. 15 shows a flowchart of a method of using the electronic door lock having a bi-directional overrunning clutch according to certain embodiments of the present disclosure.

In yet another aspect, as shown in FIG. 15, the present disclosure relates to a method 1500 of operating an electronic door lock 200 having a bi-directional overrunning clutch 100. In certain embodiments, the method includes: installing the electronic door lock 200 on a door 210. The method also includes several options to operate the electronic door lock 200.

At block 1502, a user installs the electronic door lock 200 having a bi-directional overrunning clutch 100. In certain embodiments, as shown in FIG. 14, the electronic door lock 200 includes: a first locking mechanism 202 to be operated from an outside of the door 210, a second locking mechanism 204 to be operated from an inside of the door 210, and a third locking mechanism 206 to be operated by the user electronically near the door 210, either inside or outside of the door 210.

At block 1504, in certain embodiments, the user operates the electronic door lock 200 using the first locking mechanism 202 when opening the door 210 from the outside. In one embodiment, the first locking mechanism 202 is a horizontally positioned first handle bar 202. When the user presses the first handle bar 202, the first handle bar 202 provides a first torque 1022 to a rotatable shaft 102 and an inner wheel 104 fixedly attached to the rotatable shaft 102 and turns the rotatable shaft 102 in a first direction to retract a locking tongue 2082 to unlock the electronic door lock 200. In another embodiment, the first locking mechanism 202 is a round knob 202. When the user rotates the round knob 202, the round knob 202 provides the first torque 1022 to the rotatable shaft 102 and the inner wheel 104 and turns the rotatable shaft 102 in the first direction to retract the locking tongue 2082 to unlock the electronic door lock 200.

At block 1506, in certain embodiments, the user operates the electronic door lock 200 using the second locking mechanism 204 when opening the door 210 from the inside. In one embodiment, the second locking mechanism 204 is a horizontally positioned second handle bar 204. When the user presses the second handle bar 204, the second handle bar 204 provides the first torque 1022 to the rotatable shaft 102 and the inner wheel 104 and turns the rotatable shaft 102 in the first direction to retract the locking tongue 2082 to unlock the electronic door lock 200. In another embodiment, the second handle bar 204 is a round knob 204. When the user rotates the round knob 204, the round knob 204 provides the first torque 1022 to the rotatable shaft 102 and the inner wheel 104 and turns the rotatable shaft 102 in the first direction to retract the locking tongue 2082 to unlock the electronic door lock 200.

At block 1508, in certain embodiments, the user operates the electronic door lock 200 using the third locking mechanism 206 when the user opens the door 210 electronically through an electronic controller 2068 near the door 210, either inside or outside of the door 210.

In certain embodiments, the third locking mechanism 206 includes: a third transmission mechanism 2062, a third driving mechanism 2064, a second torque driving motor 2066, and the electronic controller 2068. The electronic controller 2068 controls the second torque driving motor 2066 to provide a second torque 1082 to an outer wheel 108. The outer wheel 108 is rotatable coaxially around the rotatable shaft 102. The outer wheel 108 engages with the inner wheel 104 and turns the rotatable shaft 102 in the first direction to unlock the electronic door lock 200 through an overrunning clutch mechanism 106.

The electronic controller 2068 controls the second torque driving motor 2066 and the second torque driving motor 2066 generates the second torque 1082.

In certain embodiments, as shown in FIG. 14, the electronic controller 2068 includes: a processor 20682 and a non-volatile memory 20683. The non-volatile memory 20683 includes an operating system 20684, a communication module 20685, a lock control module 20686, and a user authentication module 20687.

In certain embodiments, the user uses the communication module 20682 to operate the electronic door lock 200 through the lock control module 20686 to provide the second torque 1082 to the outer wheel 108 through the third driving mechanism 2064 and the third transmission mechanism 2062 of the third locking mechanism 206. In certain embodiments, a user may use one or more Application Programs (APPs) on a smart phone and a communication network 20681 to operate the electronic door lock 200. The communication network 20681 includes at least one of: a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network.

In certain embodiments, the user uses the user authentication module 20684 to operate the electronic door lock 200 through the lock control module 20686 to provide the second torque 1082 to the outer wheel 108 through the third driving mechanism 2064 and the third transmission mechanism 2062 of the third locking mechanism 206.

In certain embodiments, the user authentication module 20687 receives user authentication signals from one or more user authentication sensors 20688. In one embodiment, the user authentication sensors 20688 is a keypad and the user enters a code to open the electronic door lock 200. In another embodiment, the user authentication sensors 20688 is a card reader and the user uses a keycard or a RFID card to open the electronic door lock 200. In yet another embodiment, the user authentication sensors 20688 is a FaceID authentication device and when the user passes through the FaceID authentication device, the user authentication module 20687 authenticates the user and determines whether to open the electronic door lock 200.

In certain embodiments, the user authentication sensors 20688 includes a finger print authentication device. When the user put a predetermined finger into the finger print authentication device, the finger print authentication device obtains the finger print images and sends the obtained finger print images to the user authentication module 20687. The user authentication module 20687 authenticates the user and determines whether to open the electronic door lock 200.

In certain embodiments, the user authentication sensors 20688 includes a finger vein authentication device. When the user put a predetermined finger into the finger vein authentication device, the finger vein authentication device obtains the finger vein pattern images and sends the obtained finger vein pattern images to the user authentication module 20687. The user authentication module 20687 authenticates the user and determines whether to open the electronic door lock 200.

At query block 1510, the user decides whether to continue to use the electronic door lock 200. If yes, the method 1500 proceeds back to block 1504. Otherwise, the method 1500 ends.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A bi-directional overrunning clutch, comprising:
   a rotatable shaft;
   an inner wheel fixedly attached to the rotatable shaft, wherein the inner wheel receives a first torque through rotation of the rotatable shaft;
   an outer wheel rotatable coaxially around the rotatable shaft, wherein the outer wheel receives a second torque from an electrical driving mechanism; and
   an overrunning clutch mechanism, wherein the overrunning clutch mechanism comprises a magnetic face plate, a first embedded straight edge and a second embedded straight edge forming an acute angle on a first surface of the outer wheel, a magnetic pin attached magnetically and moveable on the magnetic face plate, and the inner wheel, wherein the inner wheel defines a plurality of notches equally spaced around an outer edge of the inner wheel, wherein when the outer wheel is rotating, one of the first and the second embedded straight edges presses the magnetic pin inward to engage the outer wheel with the inner wheel through one of the plurality of notches to drive the inner wheel to rotate along with the outer wheel, and when the inner wheel is rotating, one of the plurality of notches pushes the magnetic pin outward to disengage the inner wheel from the outer wheel and the outer wheel does not rotate along with the inner wheel and the rotatable shaft, and the overrunning clutch mechanism engages with the inner wheel and the outer wheel to pass the first torque and the second torque to the rotatable shaft, when the outer wheel rotates at the second torque, the inner wheel and the rotatable shaft rotate along with the outer wheel, and when the inner wheel rotates at the first torque, the outer wheel does not rotate along with the inner wheel and the rotatable shaft.

2. The bi-directional overrunning clutch of claim 1, wherein each of the inner wheel and the outer wheel rotates in a first direction, and a second, opposite direction.

3. The bi-directional overrunning clutch of claim 1, wherein when the outer wheel rotates at the second torque, the inner wheel and the rotatable shaft rotate along with the outer wheel in the same direction.

4. The bi-directional overrunning clutch of claim 1, wherein the outer wheel receives the second torque from the electrical driving mechanism through at least one of a gear and a belt.

5. The bi-directional overrunning clutch of claim 1, wherein the inner wheel receives the first torque through at least one of a gear, a belt, a knob, and a handle bar, and receives the second torque through the overrunning clutch mechanism.

6. An electronic door lock having a bi-directional overrunning clutch, comprising:
   a first locking mechanism, wherein the first locking mechanism drives an inner wheel through a first torque to rotate a rotatable shaft to operate a locking device on a door by a user from an outside;
   a second locking mechanism, wherein the second locking mechanism drives the inner wheel through the first torque to operate the locking device on the door by the user from an inside;
   a third locking mechanism, wherein the third locking mechanism drives an outer wheel rotatable coaxially around the rotatable shaft through a second torque to operate the locking device on the door by the user electronically; and
   the bi-directional overrunning clutch, an overrunning clutch mechanism comprises a magnetic face plate, a first embedded straight edge and a second embedded straight edge forming an acute angle on a first surface of the outer wheel, a magnetic pin attached magnetically and moveable on the magnetic face plate, and the inner wheel, wherein the inner wheel defines a plurality of notches equally spaced around an outer edge of the inner wheel, wherein when the outer wheel is rotating, one of the first and the second embedded straight edges presses the magnetic pin inward to engage the outer wheel with the inner wheel through one of the plurality of notches to drive the inner wheel to rotate along with the outer wheel, and when the inner wheel is rotating, one of the plurality of notches pushes the magnetic pin outward to disengage the inner wheel from the outer wheel and the outer wheel does not rotate along with the inner wheel and the rotatable shaft, and when the outer wheel rotates at the second torque, the inner wheel and the rotatable shaft rotate along with the outer wheel, and when the inner wheel rotates at the first torque, the outer wheel does not rotate along with the inner wheel and the rotatable shaft.

7. The electronic door lock of claim 6, wherein each of the inner wheel and the outer wheel rotates in a first direction, and a second, opposite direction, and when the outer wheel rotates at the second torque, the inner wheel and the rotatable shaft rotate along with the outer wheel in the same direction.

8. The electronic door lock of claim 6, wherein the bi-directional overrunning clutch comprises:
   the rotatable shaft;
   the inner wheel fixedly attached to the rotatable shaft, wherein the inner wheel receives the first torque through rotation of the rotatable shaft;
   the outer wheel, wherein the outer wheel receives the second torque from an electrical driving mechanism and rotates around the rotatable shaft; and
   the overrunning clutch mechanism, wherein the overrunning clutch mechanism engages with the inner wheel and the outer wheel to pass the first torque and the second torque to the rotatable shaft to operate the locking device on the door, when the outer wheel rotates at the second torque, the inner wheel and the rotatable shaft rotate along with the outer wheel, and when the inner wheel rotates at the first torque, the outer wheel does not rotate along with the inner wheel and the rotatable shaft.

9. The electronic door lock of claim 6, wherein the locking device comprises a locking tongue, wherein the locking tongue is in an extended position when the door is locked, and the locking tongue is in a retracted position when the door is unlocked.

10. The electronic door lock of claim 6, wherein the first locking mechanism comprises a first driving mechanism, and a first transmission mechanism, wherein the first driving mechanism generates the first torque and the first transmission mechanism transmits the first torque to the rotatable shaft.

11. The electronic door lock of claim 6, wherein the first locking mechanism comprises a first handle bar, wherein the first handle bar is in horizontal position when the door is locked, and when the user presses the first handle bar from the outside in the first direction, the rotatable shaft rotates in the first direction to retract the locking tongue and unlock the door.

12. The electronic door lock of claim 6, wherein the second locking mechanism comprises a second driving mechanism, and a second transmission mechanism, wherein the second driving mechanism generates the first torque and the second transmission mechanism transmits the first torque to the rotatable shaft.

13. The electronic door lock of claim 6, wherein the second locking mechanism comprises a second handle bar, wherein the second handle bar is in horizontal position when the door is locked, and when the user presses the second handle bar from the inside in the first direction, the rotatable shaft rotates in the first direction to retract the locking tongue and unlock the door.

14. The electronic door lock of claim 6, wherein the third locking mechanism comprises: a third transmission mechanism, a third driving mechanism, a second torque driving motor, and an electronic controller, wherein the electronic controller controls the second torque driving motor and the second torque driving motor generates the second torque, the electronic controller comprises a communication module, a user authentication module, and a lock control module, the user uses the communication module and the user authentication module to operate the electronic door lock through the lock control module to provide the second torque to the outer wheel through the third driving mechanism and the third transmission mechanism of the third locking mechanism, when the outer wheel is rotating at the second torque, the inner wheel and the rotatable shaft rotate along with the outer wheel in the same direction to retract the locking tongue and unlock the door.

15. The electronic door lock of claim 14, wherein the user communicates with the communication module through at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network, and the user authentication module uses at least one of a keypad, a card reader, a RFID sensor, a face ID authentication device, a finger print authentication device, a finger vein authentication device, and any combination of these devices for user authentication.

16. A method of operating an electronic door lock having a bi-directional overrunning clutch, comprising:

installing, by a user, the electronic door lock having the bi-directional overrunning clutch on a door, wherein the electronic door lock comprises: a first locking mechanism to be operated from an outside of the door, a second locking mechanism to be operated from an inside of the door, and a third locking mechanism;

operating, by the user, the first locking mechanism by providing a first torque to a rotatable shaft and an inner wheel fixedly attached to the rotatable shaft to turn the rotatable shaft in a first direction to unlock the electronic door lock, when the user opens the door from the outside;

operating, by the user, the second locking mechanism by providing the first torque to the rotatable shaft and the inner wheel fixedly attached to the rotatable shaft to turn the rotatable shaft in the first direction to unlock the electronic door lock, when the user opens the door from the inside; and operating, by the user, the third locking mechanism when the user opens the door electronically through an electronic controller, wherein the electronic controller controls a second torque driving motor to provide a second torque to an outer wheel rotatable coaxially around the rotatable shaft, to engage the outer wheel with the inner wheel and to turn the rotatable shaft in a first direction to unlock the electronic door lock through an overrunning clutch mechanism, wherein the overrunning clutch mechanism comprises a magnetic face plate, a first embedded straight edge and a second embedded straight edge forming an acute angle on a first surface of the outer wheel, a magnetic pin attached magnetically and moveable on the magnetic face plate, and the inner wheel, wherein the inner wheel defines a plurality of notches equally spaced around an outer edge of the inner wheel, wherein when the outer wheel is rotating, one of the first and the second embedded straight edges presses the magnetic pin inward to engage the outer wheel with the inner wheel through one of the plurality of notches to drive the inner wheel to rotate along with the outer wheel, and when the inner wheel is rotating, one of the plurality of notches pushes the magnetic pin outward to disengage the inner wheel from the outer wheel and the outer wheel does not rotate along with the inner wheel and the rotatable shaft, and the electronic controller comprises a communication module, a user authentication module, and a lock control module, the user uses the communication module and the user authentication module to operate the electronic door lock through the lock control module to provide the second torque to the outer wheel through a third driving mechanism and a third transmission mechanism of the third locking mechanism, when the outer wheel is rotating at the second torque, the inner wheel and the rotatable shaft rotate along with the outer wheel in the same direction to retract the locking tongue and unlock the door.

17. The method of claim 16, wherein the user communicates with the communication module through at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network, and the user authentication module uses at least one of a keypad, a card reader, a RFID sensor, a face ID authentication device, a finger print authentication device, a finger vein authentication device, and any combination of these devices for user authentication.

* * * * *